Oct. 1, 1935.  L. H. SIMONSSON  2,015,821
JOINT FOR ARTIFICIAL LIMBS
Filed Nov. 4, 1932
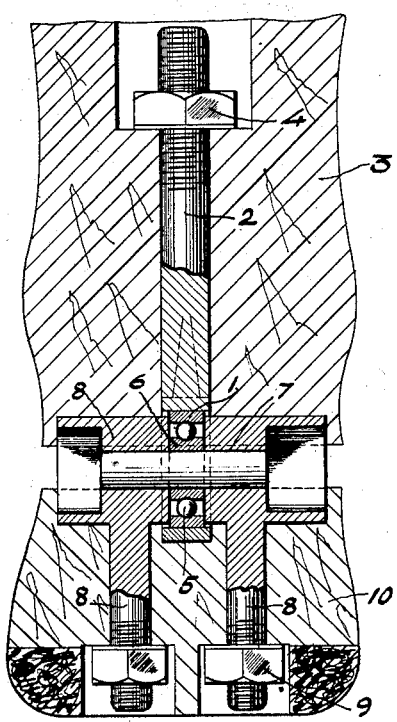
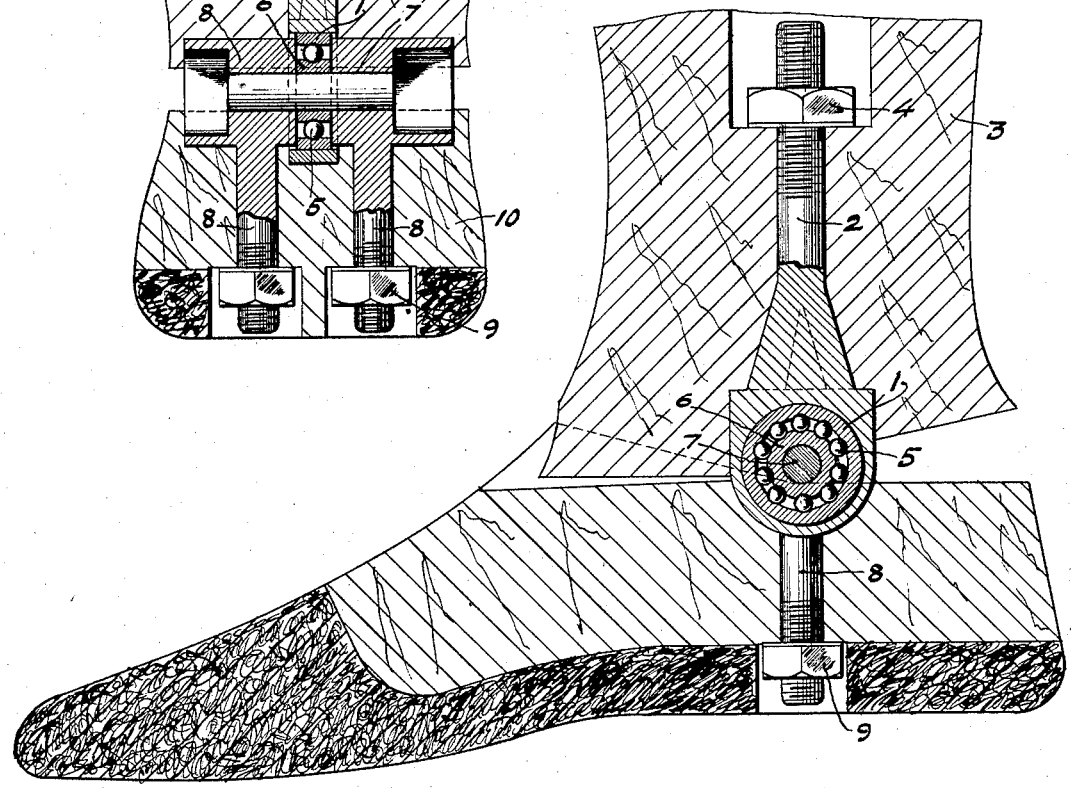
INVENTOR:
L. H. Simonsson Patented Oct. 1, 1935

2,015,821

UNITED STATES PATENT OFFICE 2,015,821

JOINT FOR ARTIFICIAL LIMBS

Ludvig Hjalmar Simonsson, Stockholm, Sweden

Application November 4, 1932, Serial No. 641,251
In Sweden June 17, 1932

1 Claim. (Cl. 287—100)

This invention relates to artificial feet having a joint constructed so as to avoid, as far as possible, friction, wear and the play thereby produced and to allow a uniform and steady walk. Trials have already been made with the object of producing a joint able to endure more favourably the influence of time and wear in relation to other parts of the artificial limb.

The annexed drawing shows an embodiment of a joint according to the invention. Fig. 1 is a section through the joint, in front view, and Fig. 2 is a side view of a section through the same joint. The joint consists of a ball-bearing arranged in the center of the joint in such a way as to allow its side portions to form, firstly a guide for the bearing, secondly to rest closely against the exterior ball-race, in order to protect the ball-races from dust and other particles.

According to the embodiment shown, the joint consists of an exterior ball-race 1, secured by a holder 2, bolted to one of the jointed parts of the limb, for instance the lower limb 3 by means of the nut 4. The balls 5 are located between the exterior ball-race 1 and the interior ball-race 6, fixed to the pin 7, secured to the other jointed parts of the limb for instance the foot 10 by means of the threaded side portions 8 and a nut 9.

I claim:

An artificial limb pivot joint comprising a center member having an opening therein, a ball bearing having its outer race fixed in said opening, a pin fixed in the inner race of the bearing and having an end projecting from each side of the race, a pair of side pieces, one secured on each of the projecting ends of the pin, said side pieces and said center member each having a bolt projecting therefrom for attachment to parts of the artificial limb, and said side pieces closely overlying the outer race of the bearing to prevent entry of dust to the bearing surfaces.

LUDVIG HJALMAR SIMONSSON.